United States Patent
Ishikawa (10) Patent No.: US 9,004,691 B2
(45) Date of Patent: Apr. 14, 2015

(54) HEAD-UP DISPLAY DEVICE USING A CONCAVE CYLINDRICAL LENS FOR PROJECTING IMAGE ON SCREEN

(75) Inventor: Toshiki Ishikawa, Ichinomiya (JP)

(73) Assignee: Denso Corporation, Kariya (JP)

( * ) Notice: Subject to any disclaimer, the term of this patent is extended or adjusted under 35 U.S.C. 154(b) by 483 days.

(21) Appl. No.: 13/278,352

(22) Filed: Oct. 21, 2011

(65) Prior Publication Data

US 2012/0099032 A1  Apr. 26, 2012

(30) Foreign Application Priority Data

Oct. 26, 2010 (JP) ................................ 2010-239815

(51) Int. Cl.
*G02B 27/01* (2006.01)

(52) U.S. Cl.
CPC .... *G02B 27/0101* (2013.01); *G02B 2027/0118* (2013.01)

(58) Field of Classification Search
USPC ...................................................... 353/13, 14
See application file for complete search history.

(56) References Cited

U.S. PATENT DOCUMENTS

| | | | | |
|---|---|---|---|---|
| 3,887,273 A * | 6/1975 | Griffiths | ........................... | 353/14 |
| 5,161,480 A * | 11/1992 | Furuya et al. | ................. | 116/62.1 |
| 5,896,231 A * | 4/1999 | Oikawa | ........................ | 359/631 |
| 7,298,557 B2 * | 11/2007 | Dobschal et al. | ............. | 359/630 |
| 7,677,736 B2 * | 3/2010 | Kasazumi et al. | ............. | 353/69 |
| 2002/0084950 A1 * | 7/2002 | Aoki et al. | ........................ | 345/7 |
| 2006/0285078 A1 * | 12/2006 | Kasazumi et al. | ............. | 353/37 |
| 2007/0229394 A1 * | 10/2007 | Ishikawa et al. | ................. | 345/7 |
| 2008/0204673 A1 * | 8/2008 | Hirata et al. | ..................... | 353/99 |

FOREIGN PATENT DOCUMENTS

| | | |
|---|---|---|
| JP | 63-182935 | 11/1988 |
| JP | H5-341226 | 12/1993 |
| JP | 2000-056254 | 2/2000 |
| JP | 2003-215552 | 7/2003 |
| JP | 2004-126025 | 4/2004 |

(Continued)

OTHER PUBLICATIONS

Office Action dated Oct. 8, 2012 issued in corresponding Korean Application No. 10-2011-109363 with English translation.

(Continued)

*Primary Examiner* — Toan Ton
*Assistant Examiner* — Bao-Luan Le
(74) *Attorney, Agent, or Firm* — Harness, Dickey & Pierce, PLC (57) ABSTRACT

A head-up display device for projecting an image on a display screen includes: a liquid crystal display element for generating an original image; a light source for emitting light toward the liquid crystal display element; a reflection mirror for reflecting a light image of the original image passing through the liquid crystal display element and for projecting the light image on the display screen; and a concave cylindrical lens having a concave surface and disposed between the liquid crystal display element and the reflection mirror. The concave surface has a curved shape along with x axis of three-dimensional coordinates of the concave cylindrical lens. The concave surface extends along with y axis. The concave surface is rotated around the x axis so that z axis of the concave surface is tilted from an optical axis from the light source to the reflection mirror.

8 Claims, 9 Drawing Sheets

(56) References Cited

FOREIGN PATENT DOCUMENTS

| JP | 2005-206133 | 8/2005 |
|---|---|---|
| JP | 2007-148092 | 6/2007 |

OTHER PUBLICATIONS

Office Action issued Dec. 4, 2012 in corresponding Japanese Application No. 2010-239815 with English translation.

* cited by examiner

HEAD-UP DISPLAY DEVICE USING A CONCAVE CYLINDRICAL LENS FOR PROJECTING IMAGE ON SCREEN

CROSS REFERENCE TO RELATED APPLICATION

This application is based on Japanese Patent Application No. 2010-239815 filed on Oct. 26, 2010, the disclosure of which is incorporated herein by reference.

TECHNICAL FIELD

The present invention relates to a head-up display device for projecting an image on a display screen.

BACKGROUND

Conventionally, in a head-up display device, a technique for reducing uneven brightness of an image, which is projected on a display screen such as a windshield, is well known. For example, a lighting device described in JP-B2-4437675 includes a liquid crystal display element for generating an original image of a projected image, a light emitting diode for emitting light toward the liquid crystal display element, and a concave mirror for projecting the original image on a display screen. A concave lens is arranged between the concave mirror and the liquid crystal display element, so that uneven brightness of the projected image is reduced, and further, a magnification ratio between the projected image and the original image increases.

The functions of the concave lens arranged between the concave mirror and the liquid crystal display element will be explained as follows. The intensity of light emitted from the liquid crystal display element is reduced when the angle of the light with respect to the optical axis directed from the light emitting diode to the concave mirror becomes large. Accordingly, when the light transmitted through the liquid crystal display element along with the optical axis is diffused by the effect of the concave lens, the brightness of light at the center of the projected image on the display screen is restricted. On the other hand, the brightness of light at the periphery of the projected image is increased. Thus, the uneven brightness of the projected image is reduced.

When the concave lens is positioned between the concave mirror and the liquid crystal display element such that the concave surface of the concave lens faces the concave mirror, the following difficulties may arise. The difficulties relate to ambient light, which is reflected on the projected image. Specifically, the ambient light enters from a certain direction, and is reflected by the concave mirror. Then, the reflected ambient light reaches the concave surface of the concave lens, which faces the concave mirror. The ambient light enters the concave mirror, and then, is reflected toward the concave mirror by a part of the concave surface, which is positioned perpendicularly to the optical axis directed from the light emitting diode to the concave mirror. The reflected ambient light together with the light image of the original image transmitted through the liquid crystal display element is projected on the display screen. Thus, the ambient light is reflected on the projected image on the display screen.

SUMMARY

In view of the above-described problem, it is an object of the present disclosure to provide a head-up display device for projecting an image. The uneven brightness of a projected image is reduced, and ambient light reflected on the projected image is restricted.

According to an aspect of the present disclosure, a head-up display device for projecting an image on a display screen includes: a liquid crystal display element for generating an original image; a light source for emitting light toward the liquid crystal display element from a backside of the liquid crystal display element; a reflection mirror for reflecting a light image of the original image passing through the liquid crystal display element and for projecting the light image as a projected image on the display screen; and a concave cylindrical lens having a concave surface and disposed between the liquid crystal display element and the reflection mirror. The concave surface faces the reflection mirror. Three-dimensional coordinates are defined in the concave cylindrical lens. The concave surface has a curved shape along with x axis of the three-dimensional coordinates. The concave surface extends along with y axis of the three-dimensional coordinates. The concave surface is configured to be rotated around the x axis so that z axis of the concave surface is tilted from an optical axis. The optical axis is defined to be directed from the light source to the reflection mirror.

In the above device, since the z axis of the concave surface is tilted from an optical axis, no portion of the concave surface is perpendicular to the optical axis. Thus, even when ambient light reflected on the reflection mirror reaches the concave surface of the concave cylindrical lens, the ambient light is reflected toward a direction different from a direction to the reflection mirror. Accordingly, ambient light reflected on the projected image is restricted. Further, the concave cylindrical lens refracts light transmitted through the liquid crystal display element so that the refracted light is diffused. Thus, uneven brightness difference between a center portion and a periphery portion of the projected image is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
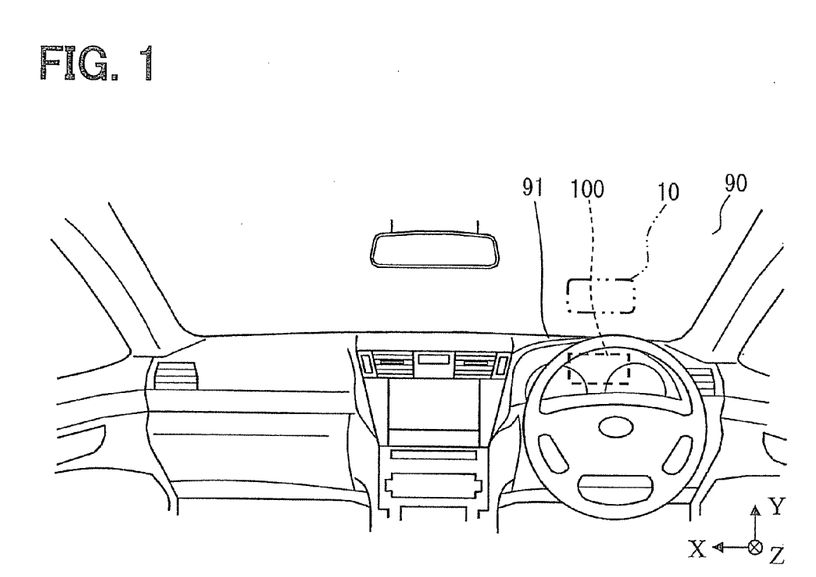
FIG. 1 is a diagram showing arrangement of a head-up display device in a compartment of a vehicle.
Figure 2:
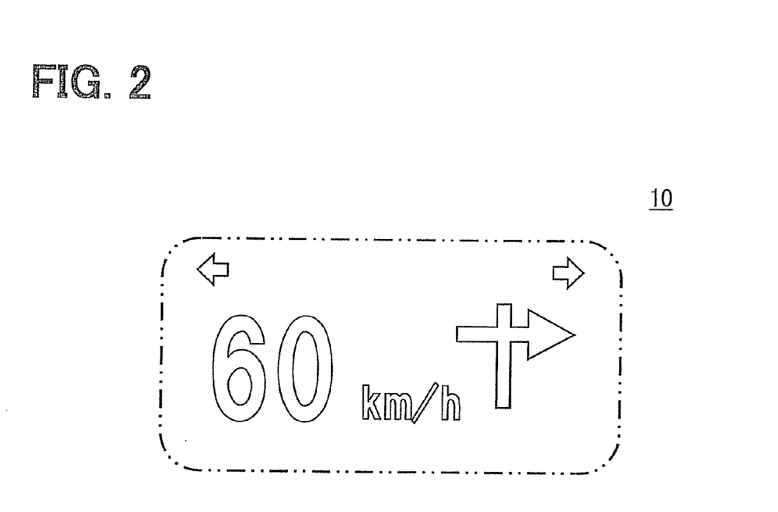
FIG. 2 is a diagram showing a projected image projected by the head-up display device.
Figure 3:
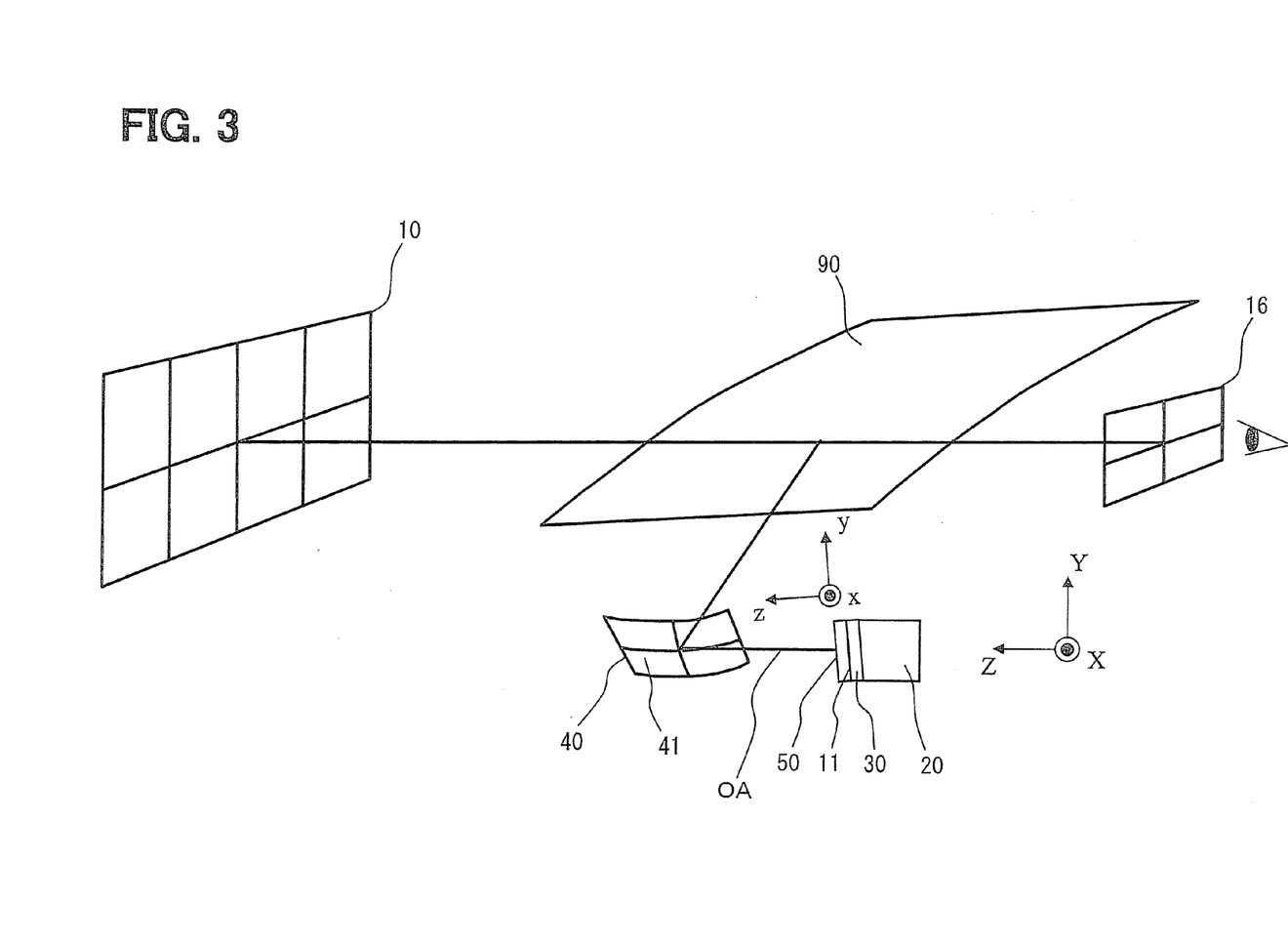
FIG. 3 is a diagram showing a mechanism of projecting an original image with the head-up display device.

A head-up display device 100 according to an example embodiment is accommodated in an instrument panel 91 of a compartment of a vehicle, as shown in FIG. 1. The head-up display device 100 projects an image 10 on a display screen such as a windshield 90 or the like, which is curved. The image 10 has, for example, an elongated shape so that a height of the image 10 in a vertical direction of the vehicle is shorter than a width of the image in a horizontal direction of the vehicle, as shown in FIG. 2. The projected image 10 shows, for example, a driving speed of the vehicle, on which the display device 100 is mounted, an indication of a traveling direction of the vehicle with using a navigation system, an indicator showing operation of a blinker, multiple warning light (not shown) and the like. The projected image 10 is formed on a slightly forward position from the windshield 90, as shown in FIG. 3. Thus, the projected image 10 provides a virtual image so that a user such as a driver recognizes the virtual image.

A structure of the head-up display device 100 will be explained with reference to FIGS. 3 and 4. The device 100 includes a liquid crystal display element 30, a standard light source 20 and a concave mirror 40.

The liquid crystal display element 30 includes a dot matrix type liquid crystal display panel. The liquid crystal display element 30 controls multiple pixels arranged on the liquid crystal display panel so that the element 30 performs full color display. The liquid crystal display element 30 generates an original image 11 for forming the projected image 10 with using the liquid crystal display panel. The liquid crystal display element 30 has a flat display surface 31, which faces the concave mirror 40. The liquid crystal display element 30 is illuminated by the standard light source 20 from a backside of the element 30.

The standard light source 20 is disposed on the backside of the element 30. The standard light source 20 emits light toward the backside of the element 30. Thus, the standard light source 20 illuminates the liquid crystal display element 30 from the backside of the liquid crystal display element 30 so that the light figure (i.e., light image) of the original image 11 is transmitted to the concave mirror 40. The standard light source 20 includes a light emitting diode 21, an inner lens 23 and a diffusion plate 25. The diode 21 is a light source for emitting white light when the diode 21 is energized. Multiple diodes 21 are arranged on a circuit board 22 at predetermined intervals.

The inner lens 23 is made of translucent material such as acrylic resin and poly carbonate resin. The inner lens 23 has an entrance surface 23a and an output surface 23b. The light emitted from each light emitting diode 21 is entered into the inner lens 23 via the entrance surface 23a. The entrance surface 23a is a plane along with a mounting surface of the light emitting diodes 21 on the circuit board 22. The output surface 23b is a convex surface, which protrudes toward the liquid crystal display element 30 in a convex manner. The inner lens 23 converges light output from the output surface 23b according to a refraction effect of the output surface 23b.

The diffusion plate 25 has a plate shape and is made of translucent material such as acrylic resin and poly carbonate resin. Each surface of the diffusion plate 25 has multiple grains as textures with fine concavities and convexities. The diffusion plate 25 diffuses the light output from the inner lens 23 by the diffusion effect of the grains. Thus, the uneven brightness of the light reaches a whole of the liquid crystal display element 30 because of the function of the diffusion plate 25.

The concave mirror 40 reflects the light image of the original image 11 output from the liquid crystal display element 30 toward the windshield 90. The concave mirror 40 is formed such that metal such as aluminum is deposited on a curved plate made of translucent resin or translucent glass. The concave mirror 40 has a reflection surface 41, which faces the display surface 31 of the liquid crystal display element 30. The reflection surface 41 is curved with respect to the liquid crystal display element 30 in a concave manner. The shape of the reflection surface 41 is determined so as to correct a distortion of the projected image 10 caused by the curved surface of the windshield 90. In addition, the projected image 10 magnified predetermined times from the original image 11 is projected on the windshield 90 since the reflection surface 41 is curved.

In the head-up display device 100, the projected image 10 having the rectangular shape is projected on the windshield 90. In the head-up display device 100, a range to be assumed as a view point of the user is defined as an eye box 16. When the user sees the projected image 11 through the eye box 16, the virtual image of the projected image 11 is precisely recognized by the user.

As shown in FIGS. 1 and 3, a horizontal direction along with a width direction of the vehicle is defined as a X axis, which is a longitudinal direction of the projected image 10. A vertical direction of the vehicle is defined as a Y axis when the vehicle is disposed on a flat ground. A vehicle front-rear direction along with the optical axis OA is defined as a Z axis.

Next, the view angle characteristics of the liquid crystal display element 30 will be explained with reference to FIGS. 5A and 5B.

The light entering into the liquid crystal display element 30 along with a direction perpendicular to the flat display surface 31 easily transmits the liquid crystal display element 30. The light entering into the liquid crystal display element 30 along with a direction tilted a certain angle of $\theta$ from the direction perpendicular to the flat display surface 31 hardly transmits the liquid crystal display element 30. Accordingly, the intensity of light emitted from the standard light source 20 and output from the liquid crystal display element 30 is reduced when the angle of $\theta$ with reference to the optical axis OA increases. Accordingly, a range of the angle of $\theta$ of light with reference to the optical axis OA is defined as a view angle when the light in the range has a predetermined intensity ratio with respect to the light output along with the optical axis OA. For example, when the angle of $\theta$ of light is in the view angle, the intensity ratio of the light with respect to the light output along with the optical axis OA is equal to or larger than 50 percents to 80 percents.

The concave cylindrical lens 50 and the like, which are arranged in the head-up display device 100 and used for the liquid crystal display element 30, will be explained with reference to FIGS. 3-4 and 6-10.

Figure 7:
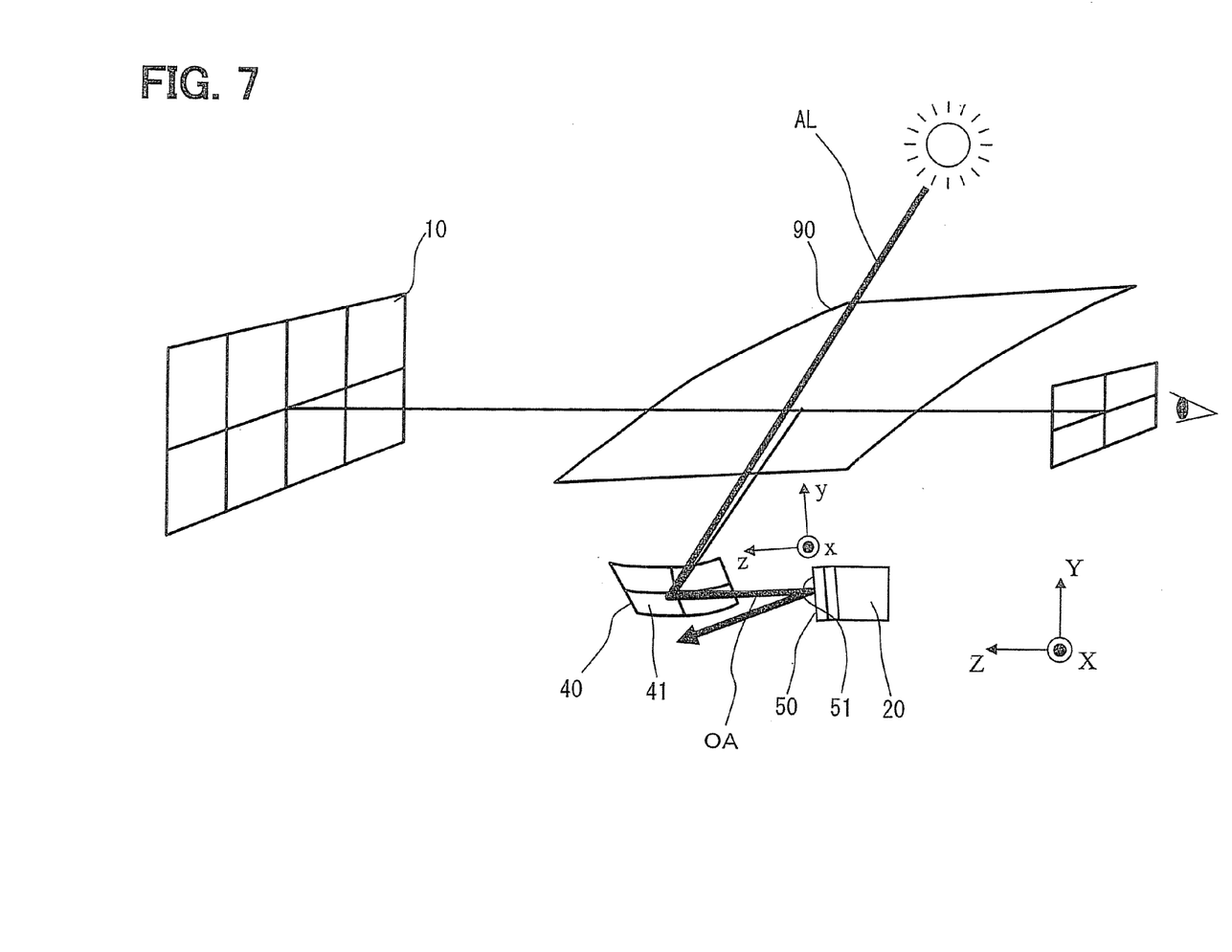
FIG. 7 is a diagram showing a case where ambient light entering a reflection surface is reflected on the reflection surface, and then, reaches a concave surface.

The concave cylindrical lens 50 is made of translucent material such as acrylic resin and poly carbonate resin. In order to explain the shape of the concave cylindrical lens 50, three dimensional coordinates are defined. As shown in FIG. 7, when the head-up display device 100 is arranged on the vehicle, the x axis of the concave cylindrical lens 50 is defined along with the above described X axis. The concave cylindrical lens 50 is disposed between the liquid crystal display element 30 and the concave mirror 40 in such a manner that the z axis of the concave cylindrical lens 50 is tilted with reference to the optical axis OA since the concave cylindrical lens 50 is rotated by 10 degrees to 20 degrees around the x axis.

Figure 4:
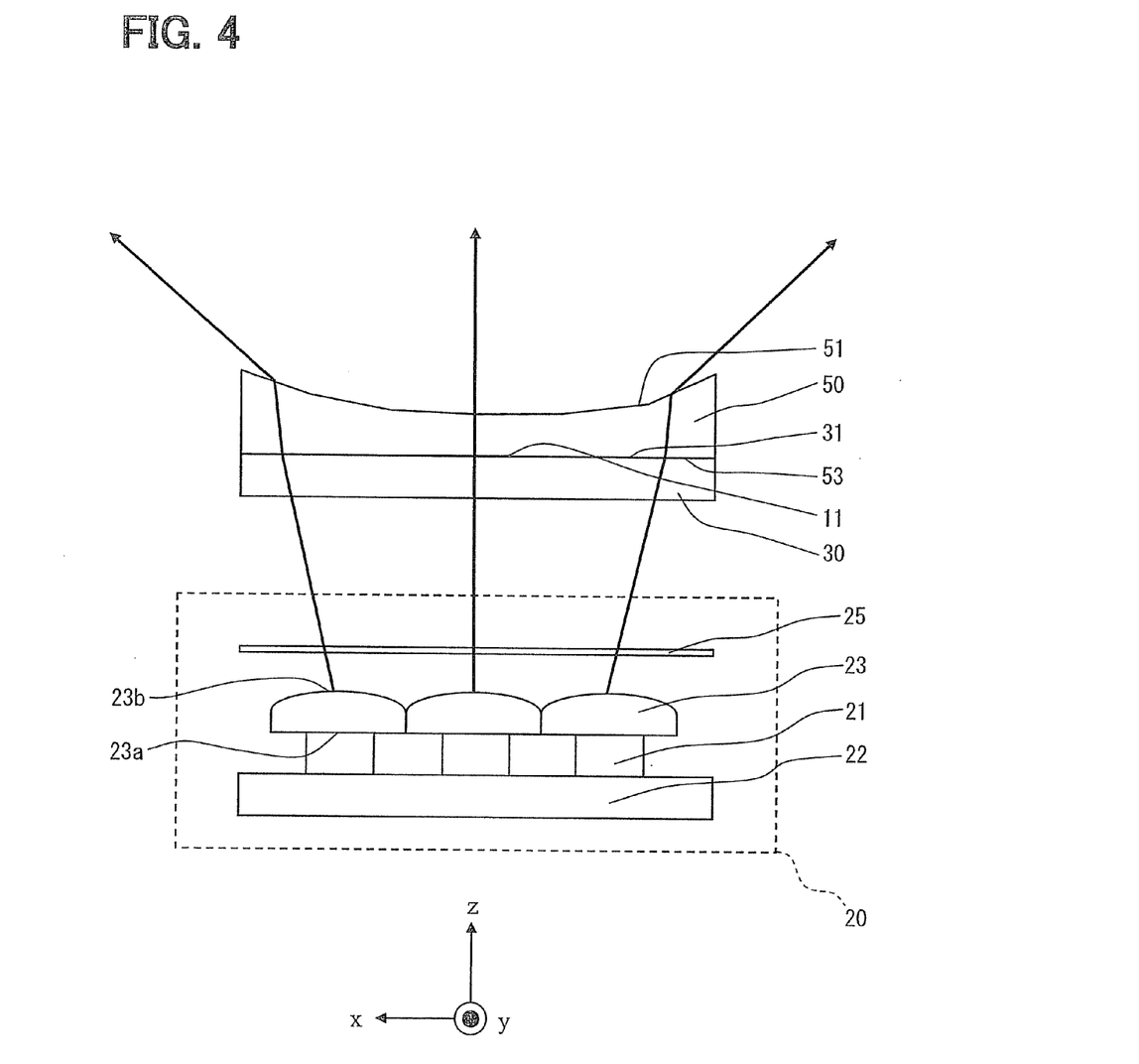
FIG. 4 is a diagram showing a refraction function of a concave cylindrical lens in the head-up display device.
Figure 5A:
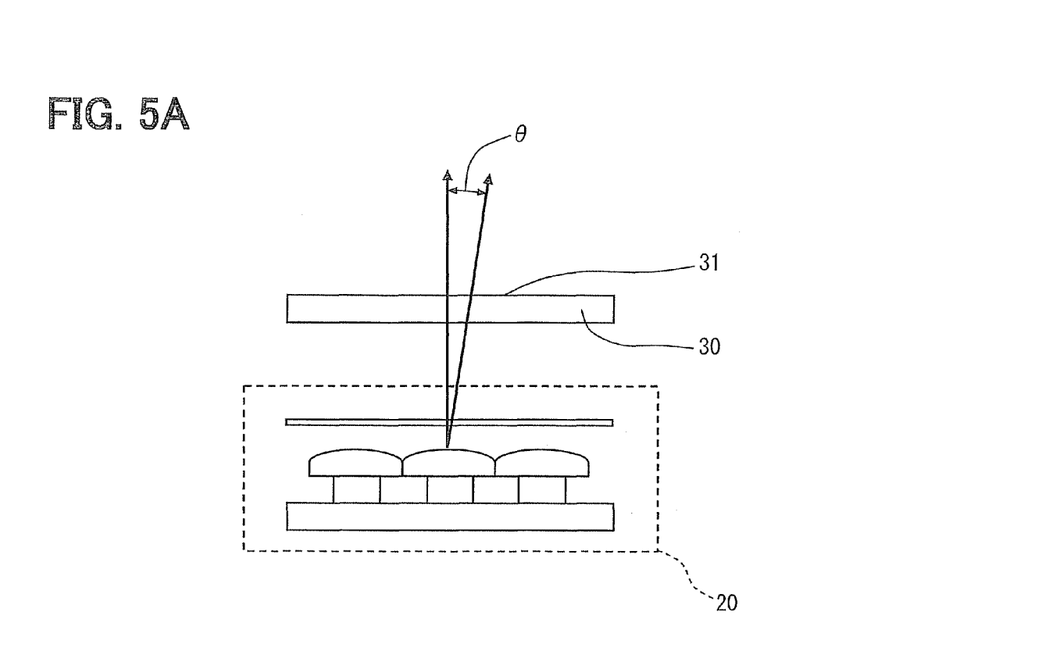
FIG. 5A is a diagram showing an angle of light emitted from a liquid crystal display element with respect to an optical axis.
Figure 5B:
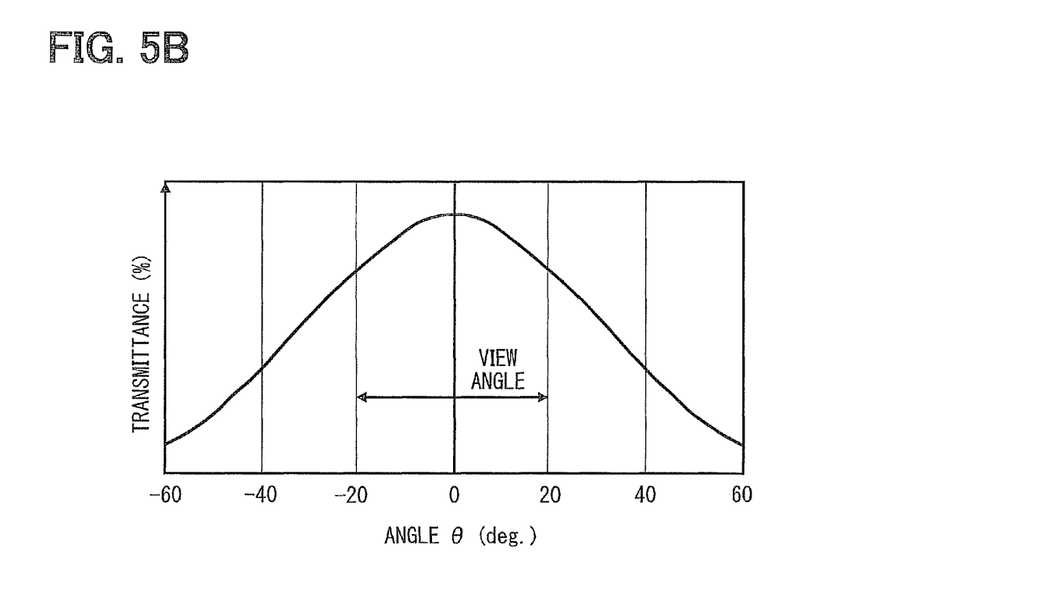
FIG. 5B is a diagram showing a graph of a relationship between the angle of the light and a transmittance.
Figure 6A:
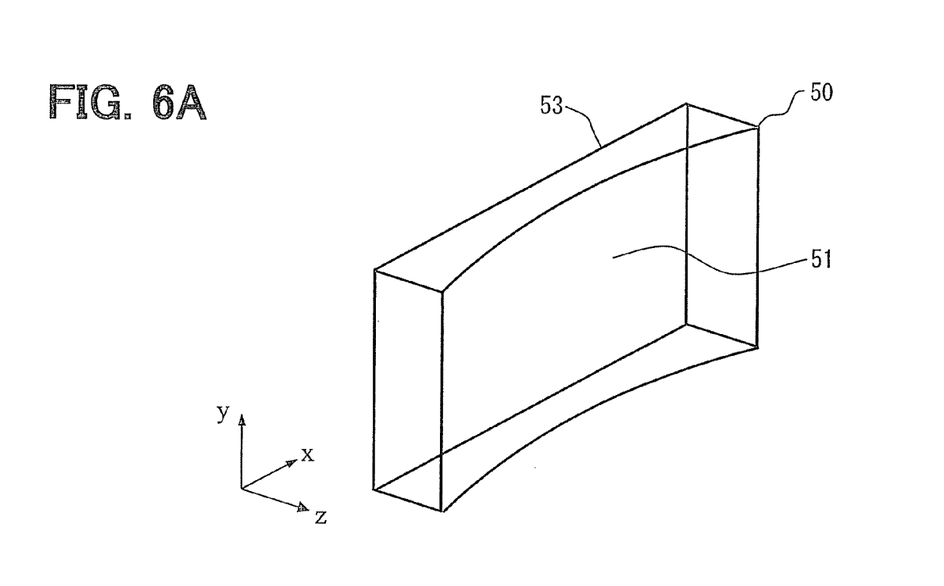
FIG. 6A is a diagram showing a perspective view of the concave cylindrical lens.
Figure 6B:
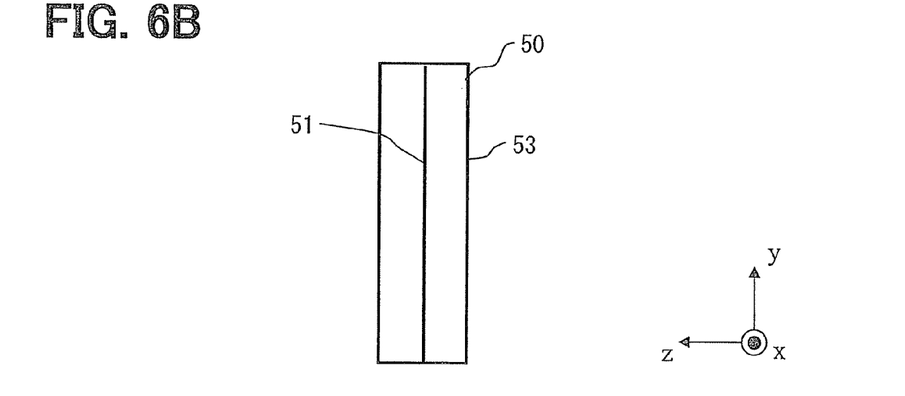
FIG. 6B is a diagram showing a side view of the concave cylindrical lens.
Figure 6C:
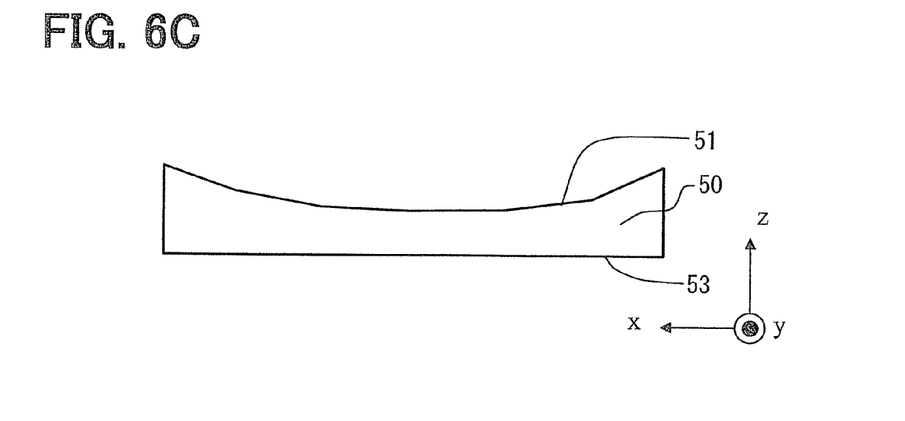
FIG. 6C is a diagram showing a plan view of the concave cylindrical lens.

As shown in FIGS. 4 to 6, the concave cylindrical lens 50 has an incident surface 53 and a concave surface 51. The light image of the original image 11 transmitted through the liquid crystal display element 30 is entered into the concave cylindrical lens 50 via the incident surface 53. The incident surface 53 is a flat surface in parallel to the x-y plane. The incident surface 53 contacts the display surface 31 of the liquid crystal display element 30. Specifically, the incident surface 53 is adhered to the display surface 31. A mutual position of the concave cylindrical lens 50 with respect to the liquid crystal display element 30 is adjusted not to generate the distortion of the light image of the original image 11 by displacing the incident surface 53 along with the x-y plane under a condition that the incident surface 53 is adhered to the display surface 31.

The concave surface 51 is opposite to the incident surface 53 in the z axis direction. The concave surface 51 faces a reflection surface 41 of the concave mirror 40, as shown in FIG. 3. The concave surface 51 is curved in a concave manner in the x axis direction along with the y axis direction. The concave cylindrical lens 50 diffuses light output from the concave surface 51 according to the refraction effect of the concave surface 51.

The shape of the reflection surface 41 of the concave mirror 40 shown in FIG. 3 is determined based on the shape of the concave surface 51. Specifically, the light image of the original image 11 is refracted by the concave surface 51. Accordingly, the projected image 10 may include a distortion caused by the refraction of the concave surface 51. Thus, the shape of the reflection surface 41 of the concave mirror 40 is determined so as to correct the distortion of the projected image 10 caused by the curve of the windshield 90 together with the distortion of the projected image 10 caused by the curve of the concave surface 51.

The concave surface 51 of the concave cylindrical lens 50 is curved in a concave manner in the x axis direction of the concave cylindrical lens 50. But, the concave surface 51 of the concave cylindrical lens 50 along with the y axis direction is not curved. Thus, no portion of the concave surface 51 is perpendicular to the optical axis OA directed to the concave mirror 40 from the standard light source 20 since the concave surface 51 is tilted in the z axis direction with respect to the optical axis OA. FIG. 7 shows a case where ambient light AL transmitted through the windshield 90 and entered into the reflection surface 41 is reflected on the reflection surface 41 so that the reflected ambient light AL reaches the concave surface 51. The ambient light AL is reflected on the concave surface 51, which has no portion perpendicular to the optical axis OA, so that the reflected ambient light AL is reflected toward a direction different from the concave mirror 40.

Further, in the head-up display device 100, one of various magnification ratios between the projected image 10 and the original image 11 is selected. The various magnification ratios between the projected image 10 and the original image 11 in the head-up display device 100 are four, six and eight. In the head-up display device 100, two different concave cylindrical lenses 50, 150 are preliminary prepared. Each concave cylindrical lens 50, 150 has a curvature radius of a concave surface, which is determined according to a corresponding magnification ratio. Further, in the head-up display device 100, three concave mirrors 40, 140, 240 are preliminary prepared. Each concave mirror 40, 140, 240 has dimensions and a curvature radius of the reflection surface, which is determined according to a corresponding magnification ratio, as shown in FIGS. 8-10.

Figure 8:
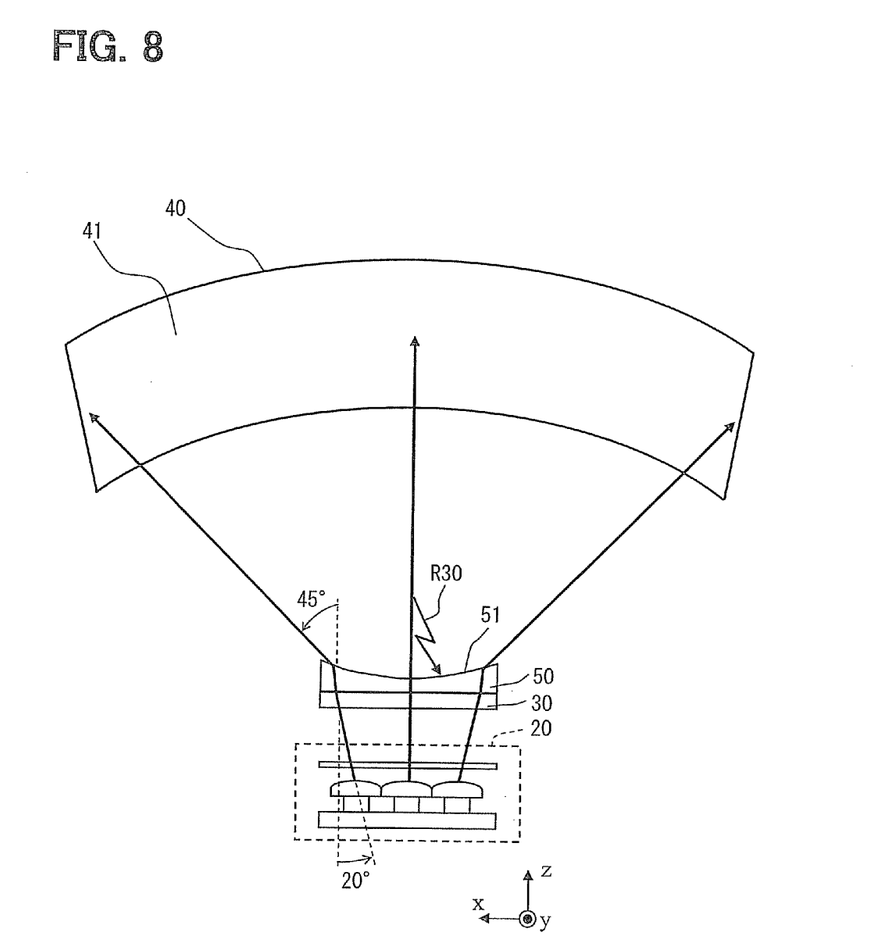
FIG. 8 is a diagram showing an arrangement of the concave cylindrical lens and the concave mirror when a magnification ratio is set to eight times.

The concave cylindrical lens 50 and the concave mirror 40 are set in the head-up display device 100 when the magnification ratio of eight is selected, as shown in FIG. 8. The concave cylindrical lens 150 and the concave mirror 140 are set in the head-up display device 100 when the magnification ratio of six is selected, as shown in FIG. 9. The concave mirror 240 without the concave cylindrical lens is set in the head-up display device 100 when the magnification ratio of four is selected, as shown in FIG. 10. Thus, in this case, the concave cylindrical lens is not set in the head-up display device 100.

Figure 9:
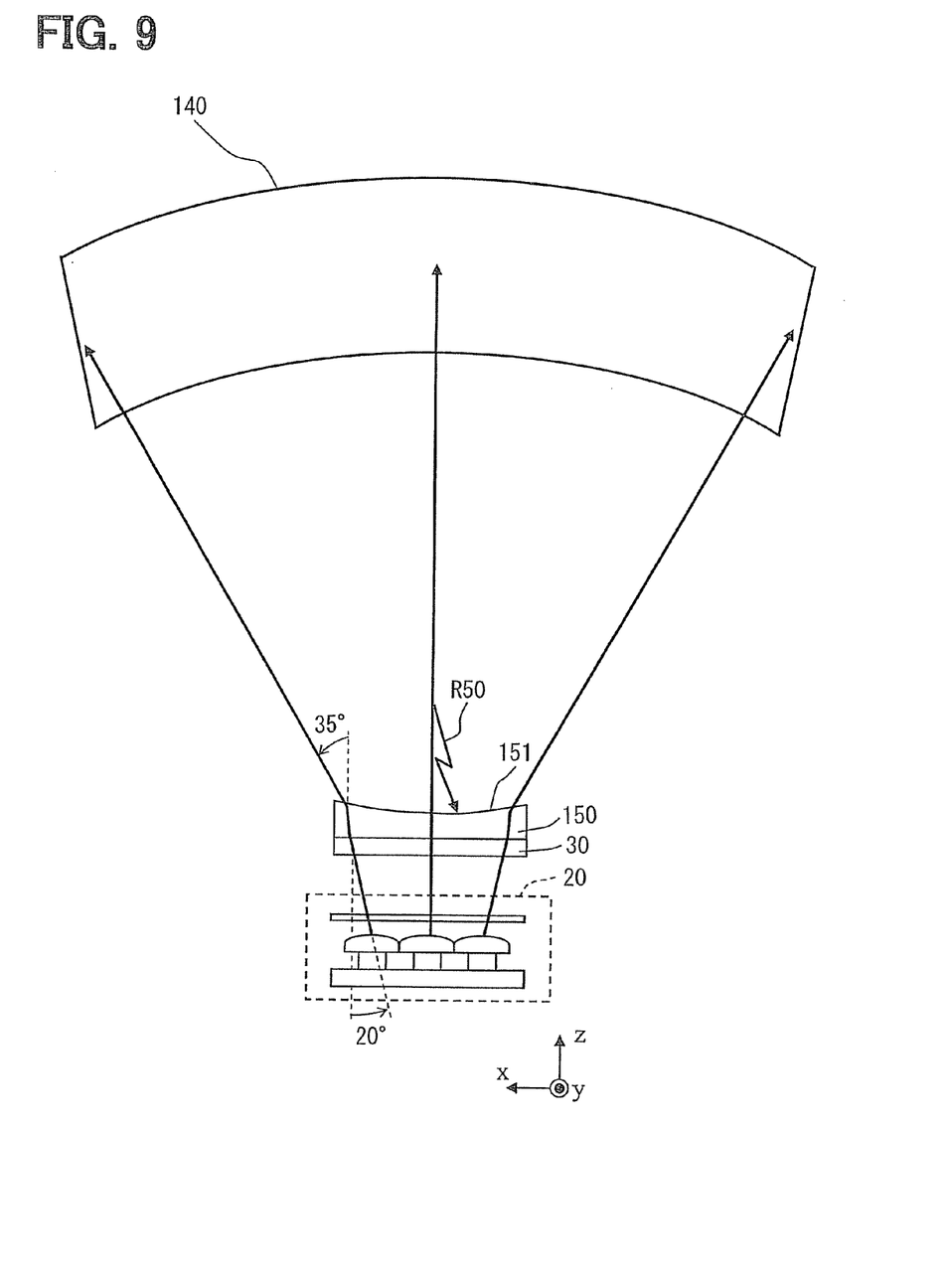
FIG. 9 is a diagram showing an arrangement of the concave cylindrical lens and the concave mirror when a magnification ratio is set to six times.
Figure 10:
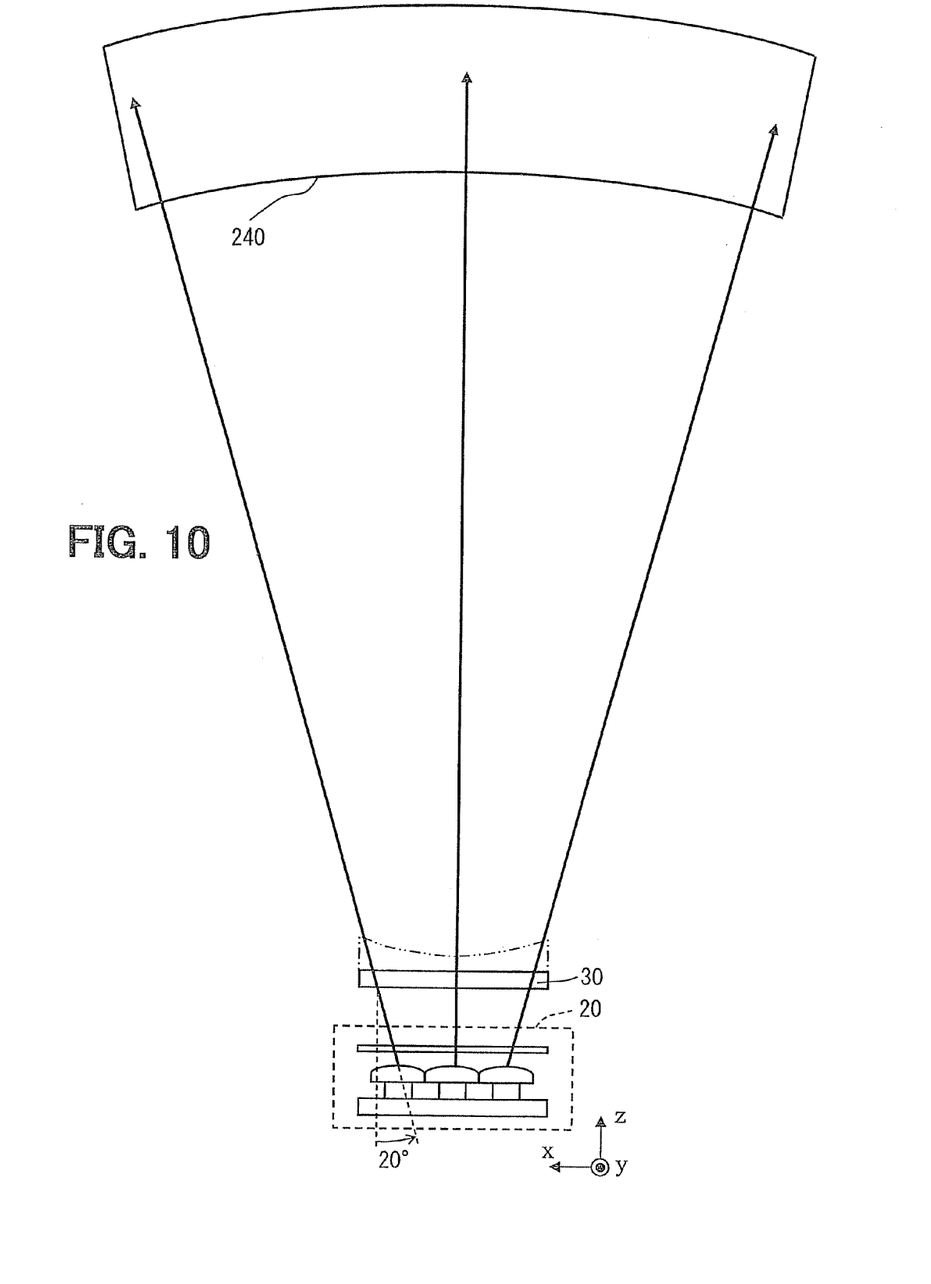
FIG. 10 is a diagram showing an arrangement of the concave cylindrical lens and the concave mirror when a magnification ratio is set to four times.

As shown in FIGS. 8-10, when the magnification ratio of the projected image 10 with respect to the original image 11 becomes large, the curvature radius of the concave surface 51, 151 in the concave cylindrical lens 50, 150 is reduced. Thus, since the refraction effect of the concave surface 51, 151 is strengthened, the view angle after the light passes through the concave surface 51, 151 increases. Specifically, the concave cylindrical lens 50 having the shape, which is determined by the magnification ratio of eight, has the curvature radius of 30 millimeters of the concave surface 51. The concave cylindrical lens 150 having the shape, which is determined by the magnification ratio of six, has the curvature radius of 50 millimeters of the concave surface 151.

The same standard light source 20 and the same liquid crystal display element 30 are used without depending on the magnification ratio. In the head-up display device 100, the distance between the concave mirror 40, 140, 240 and the standard light source 20 or the liquid crystal display element 30 is reduced when the magnification ratio becomes large. In the present embodiment, when the magnification ratio is eight, the view angles of the light image reaching the concave mirror 40 in the x axis direction and the y axis direction are required to be 45 degrees and 12 degrees, respectively. When the magnification ratio is six, the view angles of the light image reaching the concave mirror 140 in the x axis direction and the y axis direction are required to be 35 degrees and 11 degrees, respectively. When the magnification ratio is four, the view angles of the light image reaching the concave mirror 240 in the x axis direction and the y axis direction are required to be 20 degrees and 10 degrees, respectively.

In the present embodiment, the view angle of the light image at the standard light source 20 or the liquid crystal display element 30 in the x axis direction is determined to be equal to the view angle, which is required for a case where the minimum magnification ratio among various magnification ratios is set. The view angle of the light image at the standard light source 20 or the liquid crystal display element 30 in the y axis direction is determined to be equal to the view angle, which is required for a case where the maximum magnification ratio among various magnification ratios is set. Thus, the view angles of the light image at the standard light source 20 or the liquid crystal display element 30 in the x axis direction and the y axis direction are 20 degrees and 12 degrees, respectively.

Thus, a case where the magnification ratio of head-up display device 100 is set to eight, i.e., the maximum magnification ratio will be explained. As shown in FIG. 8, the view angle at the standard light source 20 or the liquid crystal display element 30 in the x axis direction is set to be 20 degrees, which corresponds to a case where the magnification ratio is set to be four as the minimum magnification ratio. When the concave cylindrical lens 50 having the concave surface 51 with the shape corresponding to the magnification ratio of eight increases the view angle up to 45 degrees by refracting light for diffusing in the x axis direction. Thus, the view angle in the x axis direction after the light image passes through the concave cylindrical lens 50 satisfies to be 45 degrees, which is required for a case where the magnification ratio is set to be eight.

The view angle at the standard light source 20 or the liquid crystal display element 30 in the y axis direction is set to be 12 degrees, which is required for a case where the magnification ratio is set to be eight. Accordingly, even if the concave cylindrical lens 50 does not diffuse light in the y axis direction, the view angle of 12 degrees, which is required in the Y axis direction, is secured.

Next, a case where the magnification ratio of head-up display device 100 is set to six, i.e., the medium magnification ratio among various magnification ratios will be explained. As shown in FIG. 9, the concave cylindrical lens 150 having the concave surface 151 with the shape corresponding to the magnification ratio of six increases the view angle up to 35 degrees by refracting light for diffusing in the x axis direction. Thus, the view angle in the x axis direction after the light image passes through the concave cylindrical lens 150 satisfies to be 35 degrees, which is required for a case where the magnification ratio is set to be six. The view angle at the standard light source 20 or the liquid crystal display element 30 in the y axis direction is set to be 12 degrees. Accordingly, even if the concave cylindrical lens 150 does not diffuse light in the y axis direction, the view angle of 11 degrees, which is required in the y axis direction, is secured.

Next, a case where the magnification ratio of head-up display device 100 is set to four, i.e., the minimum magnification ratio among various magnification ratios will be explained. The view angle at the standard light source 20 or the liquid crystal display element 30 in the x axis direction is set to be 20 degrees, which is required for a case where the magnification ratio is set to be four. Accordingly, as shown in FIG. 10, without obtaining the diffusion effect of the concave cylindrical lens, the view angle in the x axis direction is secured. The view angle at the standard light source 20 or the liquid crystal display element 30 in the y axis direction is set to be 12 degrees. Accordingly, the view angle of 10 degrees, which is required in the y axis direction, is secured.

In the present embodiment, the ambient light AL reflected on the concave surface 51 together with the light image of the original image 11 is restricted from being projected on the windshield 90 by using the shape of the concave surface 51 and the arrangement of the concave cylindrical lens 50. Further, the brightness difference of the projected image 10, which is projected on the windshield 90, between the center portion and the periphery portion is reduced by the effect of the concave surface 51, which diffuses light according to the refraction. Thus, the head-up display device 100 projects the image, which has the low uneven brightness, and ambient light reflected on the projected image is restricted.

Further, in the present embodiment, the shape of the reflection surface 41 of the concave mirror 40 is determined to correct the distortion attributed to the curvature of the windshield 90 in addition to the distortion attributed to the curvature of the concave surface 51. Accordingly, the distortion of the projected image 10 is corrected without complicating the structure of the head-up display device 100. Thus, the head-up display device 100 projects the projected image 10 on the windshield 90 without distortion, and the uneven brightness of the projected image 10 is reduced, and the ambient light reflected on the projected image is restricted.

In the present embodiment, the x axis direction of the concave cylindrical lens 50 is directed to the X axis direction as the longitudinal direction of the projected image 10 so that the light image of the original image 11 passing through the concave cylindrical lens 50 is refracted so as to diffuse in the longitudinal direction of the projected image 10. Thus, the uneven brightness of the projected image 10 in the X axis direction as the longitudinal direction of the projected image 10 is reduced. The projected image 10 has a length in the X axis direction, which is larger than a height in the Y axis direction. The projected image 10 is projected on the windshield 90. Accordingly, the uneven brightness of the projected image 10 in the X axis direction may be remarkable. Thus, it is preferable for the head-up display device 100 for projecting the horizontally long projected image 10 to direct the x axis direction of the concave cylindrical lens 50 to the X axis direction.

Further, even when the horizontally long projected image 10 is projected, and the magnification ratio is large, the view angle for the y axis direction may be smaller than the view angle for the x axis direction. Thus, it is easy to secure the view angle of the y axis direction compared with the view angle of the x axis direction. Thus, even when the concave cylindrical lens 50, 150 for diffusing light mainly in the x axis direction is used, the uneven brightness of the projected image 10 in the Y axis direction is hardly generated.

Further, in the present embodiment, even when the standard light source 20 and the liquid crystal display element 30 are commonly prepared, the head-up display device 100 projects the image, which has low uneven brightness, in each of various magnification ratios. Accordingly, the head-up display device 100 is manufactured with a low cost such that the uneven brightness is reduced, and the ambient light reflected on the projected image is restricted.

Further, in the present embodiment, since the incident surface 53, which is flat along with the x-y plane, contacts the flat display surface 31 of the liquid crystal display element 30, the rotation of the concave cylindrical lens 50 around the x axis and the y axis is restricted. A relative position of the concave cylindrical lens 50 on the x-y plane with respect to the crystal display element 30 is adjusted. Thus, the positioning accuracy of the concave cylindrical lens 50 with respect to the crystal display element 30 is high. The distortion of the projected image 10 and the uneven brightness of the projected image 10 attributed to the shift of the relative position of the concave cylindrical lens 50 with respect to the crystal display element 30 are reduced.

In the present embodiment, the standard light source 20 corresponds to a light source, and the concave mirror 40 corresponds to a reflection mirror, and the windshield 90 corresponds to a projection member.

Other Embodiments

In the above embodiment, the incident surface 53 of the concave cylindrical lens 50 is flat along with the x-y plane so that the position of the concave cylindrical lens 50 is adjusted. Alternatively, the incident surface 53 facing the display surface 31 may be curved in a concave manner with respect to the display surface 31 as long as the concave cylindrical lens 50 diffuses light on the curved surface thereof. Alternatively, the incident surface 53 may be curved in a convex manner with respect to the display surface 31. Alternatively, the incident surface 53 of the concave cylindrical lens 50 may be attached to a body of the head-up display device 100 at a position spaced apart from the display surface 31 of the crystal display element 30.

In the above embodiment, each of the concave mirrors 40, 140, 240 corresponds to a reflection mirror. Alternatively, the reflection mirror may be prepared from a combination of multiple concave mirrors and multiple lenses. Alternatively, the reflection mirror may include a reflection mirror having a flat reflection surface.

In the present embodiment, when the magnification ratio of the head-up display device 100 is four, the head-up display device 100 has no concave cylindrical lens. Alternatively, the head-up display device 100 may include the concave cylindrical lens 50 even when the magnification ratio of the head-up display device 100 is four in a case where the distance between the standard light source 20 and the concave mirror 40 is shorter than the above embodiment, and the large view angle is required. Further, the magnification ratio of the head-up display device 100 may be different from four, six and eight. For example, the magnification ratio of the head-up display device 100 may be ten. Further, the view angle required for each magnification ratio of the head-up display device 100 may be different from the above embodiment. For example, the view angle required for each magnification ratio may be varied according to the distance between the light source and the reflection mirror and the like.

In the above embodiment, even when the magnification ratio is changed, the crystal display element 30 and the standard light source 20 are commonly used in the head-up display device 100. Alternatively, the standard light source 20 and the crystal display element 30 for providing an optimum view angle may be prepared in each magnification ratio.

In the above embodiment, the concave surface 51 of the concave cylindrical lens 50 has an infinite curvature radius in the y axis direction along with the y axis direction. Alternatively, the concave surface 51 may be a slightly curved concave surface in the y axis direction as long as the concave surface 51 has no region, which is perpendicular to the optical axis OA, when the concave cylindrical lens 50 is tilted by 10 degrees to 20 degrees.

In the above embodiment, the horizontally long projected image 10 is projected on the windshield 90. Alternatively, the head-up display device 100 may project a vertically long projected image 10 on the windshield 90. In this case, it is preferable to arrange the x axis direction of the concave cylindrical lens 50 along with the Y axis direction as the vertical direction of the vehicle. The concave cylindrical lens 50 may be rotated around the x axis so that the concave cylindrical lens 50 is arranged to tilt the z axis with reference to the optical axis OA.

In the above embodiment, the head-up display device 100 projects the projected image 10 on the windshield 90. Alternatively, the head-up display device 100 may project the projected image 10 on a translucent plate such as a conbiner arranged on a top of the instrument panel 91. In this case, the curvature of the reflection surface 41 of the concave mirror 40 may not be adjusted according to a type of the vehicle.

In the present embodiment, the head-up display device 100 projects the projected image 10 on the windshield 90 of the vehicle. Alternatively, the head-up display device 100 may project the projected image 10 in front of the user of the vehicle.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A head-up display device for projecting an image on a display screen comprising:
    a liquid crystal display element for generating an original image;
    a light source for emitting light toward the liquid crystal display element from a backside of the liquid crystal display element;
    a reflection mirror for reflecting a light image of the original image passing through the liquid crystal display element and for projecting the light image as a projected image on the display screen; and
    a concave cylindrical lens having a concave surface and disposed between the liquid crystal display element and the reflection mirror,
    wherein the concave surface faces the reflection mirror,
    wherein three-dimensional coordinates are defined in the concave cylindrical lens,
    wherein the concave surface has a curved shape along with x axis of the three-dimensional coordinates,
    wherein the concave surface extends along with y axis of the three-dimensional coordinates,
    wherein the concave surface is configured to be rotated around the x axis so that z axis of the concave surface is tilted from an optical axis,
    wherein the optical axis is defined to be directed from the light source to the reflection mirror,
    wherein the head-up display device has a plurality of magnification ratios of the projected image with respect to the original image,
    wherein the concave surface of the concave cylindrical lens has a curvature radius, which corresponds to the one of the magnification ratios,
    wherein a view angle in the x axis is defined as a range of an angle of light, which is emitted with the angle in the x axis with respect to the optical axis from the light source as an original point toward the liquid crystal display element and has a predetermined intensity ratio with respect to straight light emitted along with the optical axis,
    wherein a view angle in the y axis is defined as a range of an angle of light, which is emitted with the angle in the y axis with respect to the optical axis from the light source as an original point toward the liquid crystal display element and has a predetermined intensity ratio with respect to straight light emitted along with the optical axis,
    wherein the view angle in the x axis is determined to be a view angle, which is necessary in the x axis for a case where the one of a plurality of magnification ratios is a minimum magnification ratio,
    wherein the view angle in the y axis is determined to be a view angle, which is necessary in the y axis for a case where the one of a plurality of magnification ratios is a maximum magnification ratio, and
    wherein the minimum magnification ratio of the view angle in the x axis corresponds to the maximum magnification ratio of the view angle in the y axis.

2. The head-up display device according to claim 1,
    wherein the head-up display device is mounted on a vehicle,
    wherein the display screen is a windshield of the vehicle, which is curved, and
    wherein the reflection mirror has a reflection surface with a shape, which is determined to correct a distortion of the projected image attributed to a curvature of the windshield and the concave surface of the concave cylindrical lens.

3. The head-up display device according to claim 1,
wherein the head-up display device is mounted on a vehicle,
wherein the projected image has a length in a horizontal direction of the vehicle and a height in a vertical direction of the vehicle,
wherein the length of the projected image is larger than the height of the projected image, and
wherein the x axis of the concave cylindrical lens is in parallel to the horizontal direction of the vehicle.

4. The head-up display device according to claim 1,
wherein the concave cylindrical lens has an incident surface, which contacts a display surface of the liquid crystal display element,
wherein the light image of the original image transmitted through the liquid crystal display element is entered into the concave cylindrical lens via the incident surface, and
wherein the incident surface expands on a x-y plane.

5. The head-up display device according to claim 1,
wherein the head-up display device is mounted on a vehicle,
wherein the display screen is a windshield of the vehicle,
wherein the x axis of the concave cylindrical lens is in parallel to a latitudinal direction of the vehicle,
wherein the y axis of the concave cylindrical lens is tilted from a vertical direction of the vehicle, and
wherein the z axis of the concave cylindrical lens is tilted from a longitudinal direction of the vehicle.

6. The head-up display device according to claim 5,
wherein a rotation angle of the concave surface around the x axis is in a range between 10 degrees and 20 degrees.

7. The head-up display device according to claim 6,
wherein the concave surface along with y axis is not curved,
wherein the reflection mirror has a reflection surface with a shape, which is determined to correct a distortion of the projected image attributed to a curvature of the windshield and the concave surface of the concave cylindrical lens, and
wherein the reflection mirror is a concave mirror.

8. The head-up display device according to claim 7,
wherein the concave cylindrical lens has an incident surface, which contacts a display surface of the liquid crystal display element,
wherein the light image of the original image transmitted through the liquid crystal display element is entered into the concave cylindrical lens via the incident surface, and
wherein the incident surface is a flat surface expanding on a x-y plane.

* * * * *